March 27, 1945.   D. M. MacMILLAN   2,372,216
RECAP MOLD
Filed April 27, 1943   2 Sheets-Sheet 1

Inventor
DONALD M. MacMILLAN
By Donald L. Mapson.
Attorney

March 27, 1945. D. M. MacMILLAN 2,372,216
RECAP MOLD
Filed April 27, 1943 2 Sheets-Sheet 2
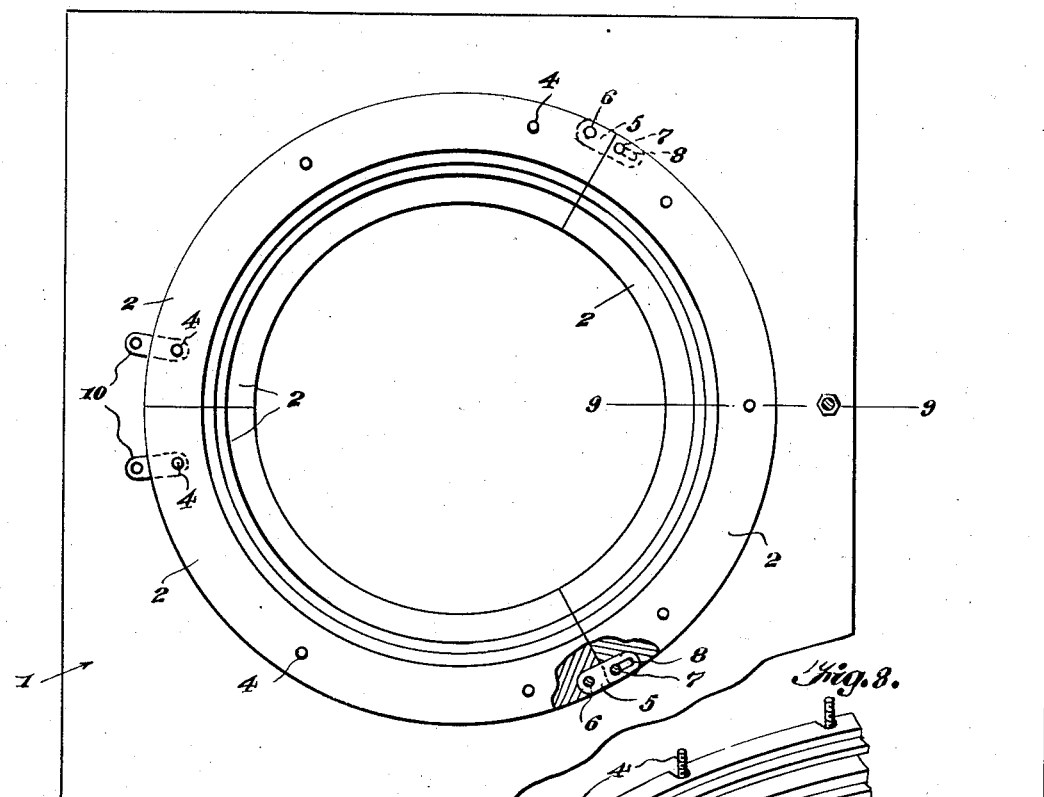
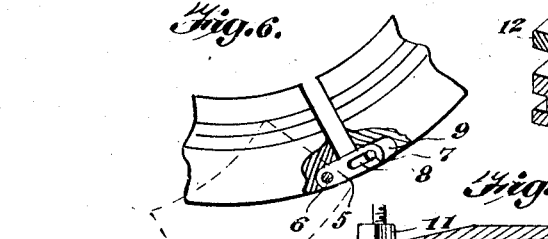
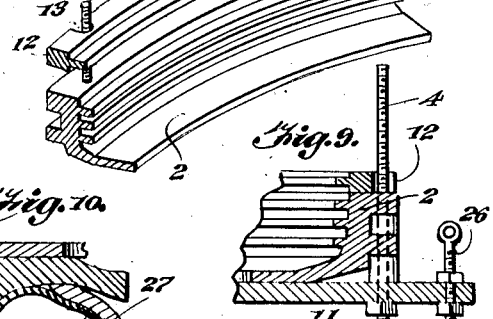
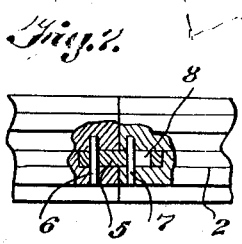
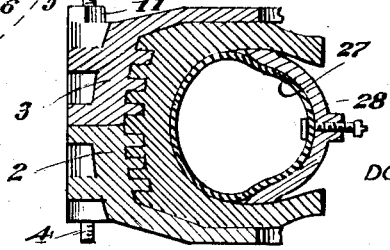
Inventor
DONALD M. MACMILLAN
Donald L. Mayson
Attorney Patented Mar. 27, 1945

2,372,216

UNITED STATES PATENT OFFICE 2,372,216

RECAP MOLD

Donald M. MacMillan, Macon, Ga.

Application April 27, 1943, Serial No. 484,759

5 Claims. (Cl. 18—18)

This invention relates to improvements in recap molds, and more particularly to a mold having a plurality of cooperating mold body sections hinged at their ends to adjacent mold body sections and each section being split circumferentially of its length and held together by a plurality of body bolts, whereby said bolts may be loosened and spacer elements inserted between the split body sections for changing the width of the matrix to accommodate tire casings of varying sizes.

An object of my invention is to provide an improved recap mold including a plurality of circumferentially split mold body sections hinged together for encirclement about a tire casing to be recapped, and a cooperating pivotally mounted adjustable heating and clamping band adapted to be swung over and about said body sections after the tire casing is in place in the mold, after which the band is tightened about the mold sections, and air admitted to the curing bag within the tire casing to firmly hold the tire casing against the matrix during the recapping operation.

Another object of my invention is to provide an improved recap mold including a plurality of circumferentially split mold body sections hinged together at their ends and a cooperating adjustable heating and clamping band, whereby when the recapping process is completed, the band may be loosened and swung up and away from the mold sections, and said mold sections swung outwardly on their hinges or peeled from the recapped casing so that the same may be readily removed from the mold.

A further object of my invention is to provide an improved recap mold for tire casings, which will quickly and efficiently recap a tire casing, and when recapped, may be readily removed from the mold with its tread intact and in perfect condition, an operation which is extremely difficult to accomplish with the use of synthetic rubber.

A still further object of my invention is to provide a recap mold having a plurality of circumferentially split mold sections hinged together at their ends and cooperating with a pivoted adjustable heating and clamping band adapted to be positioned about the mold sections after a tire casing is placed within the mold, said mold sections having means for holding them together and for supporting and positioning spacer elements between the split sections, whereby tire casings of varying sizes may be recapped.

Other objects will appear as the description proceeds.

In the accompanying drawings which form a part of my application,

Figure 5 is a plan view of my improved recap mold with the upper portions of the split mold sections removed, the same being partly broken away to show the hinge construction;

Figure 6 is a detail view showing the adjustability of the hinge construction for the mold sections;

Figure 7 is a detail view showing the hinge construction for the mold sections in tight or closed position;

Figure 8 is a perspective view of a portion of one of the lower mold segments, showing a spacer element about to be positioned on the same;

Figure 9 is a detail sectional view taken on the line 9—9 on Figure 5, and

Figure 10 is a transverse sectional view through the tire mold and tire within the same.

Like characters of reference are used throughout the following specification and the accompanying drawings to designate corresponding parts.

Figure 1:
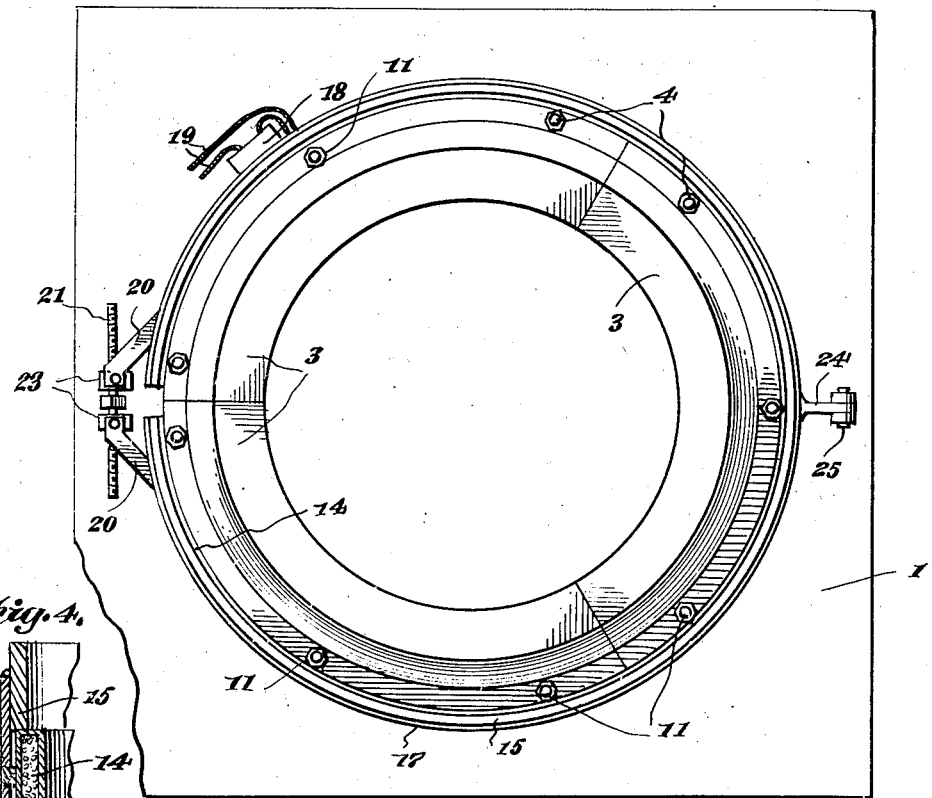
Figure 1 is a plan view of my improved tire recap mold.

In carrying out my invention, I provide a suitable mold supporting table 1, upon which I mount my improved recap mold. The mold comprises a plurality of circumferentially split mold sections 2 and 3, the lower sections being designated by the reference numerals 2 and the upper sections by the numerals 3. The split sections are held together by means of a plurality of long bolts 4 extending through their outer edges, and the bolts extending through the center section are of sufficient length to extend through the supporting table 1, as clearly illustrated in Figure 2 of the drawings, thereby anchoring the mold to the table. The outer mold sections are hinged to the outer ends of the anchored center section by means of hinges connecting the adjacent ends of the lower mold sections only. These hinges comprise slotted links 5 having their slots formed in their ends next to the ends of the anchored section, and each link 5 cooperates with the pins 6 and 7, pins 6 being carried by the lower movable mold sections, while the pins 7 extend through the slots 8 in the links 5 to permit a lengthening or shortening movement between the mold sections to facilitate the encirclement of an oversize casing when placed in the mold. The pins 7 are supported by the lower section of the center anchored section, which in turn is provided with slots 9 at its outer ends to permit the links 5 to be retracted within the said slots when the mold is closed. A pair of perforated ears 10 are secured to the adjacent outer ends of the swinging or hinged lower mold sections 2, so that after the casing has been recapped, any suitable tool may be inserted within the perforations in the said ears 10 to pull open the hinged mold sections, after which the casing may be readily removed from the mold. Nuts 11 will be positioned on the ends of the bolts 4 for holding the mold sections firmly together. I further provide a plurality of spacer elements 12 which are notched as at 13, said notches being adapted to fit over the bolts 4 when the spacer elements are inserted between the split mold sections 2 and 3, to make the mold large enough to receive different sizes of tire casings. It will be obvious that the size of the mold may be changed by inserting one or more spacer elements between each cooperating mold sections 2 and 3, and the nuts 11 tightened down on the bolts 4. Thus, the one mold may be used successfully to recap tire casings of various sizes.

Figure 4:
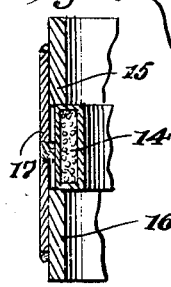
Figure 4 is a detail sectional view of the adjustable heating and clamping band when the same is in non-clamping position.
Figure 3:
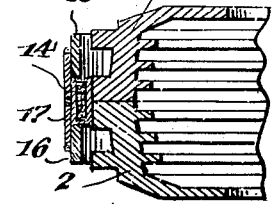
Figure 3 is a detail sectional view taken on the line 3—3 on Figure 2.

Cooperating with the split mold sections 2 and 3, I provide a combined heating and clamping band which comprises a curved electric strip heater band 14, and a pair of adjacent cooperating steel bands 15 and 16 positioned above and below the heater band 14, and a cooperating thin steel band 17, whose opposite sides are line welded to the outer surfaces of the bands 15 and 16, and said band 17 being further provided with a plurality of openings through its central circumference, through which spot welds may be made to secure it to the said heating band 14. From Figures 3 and 4 of the drawings, it will be seen how the spring action of the thin steel band 17 lines up the heating band 14 with the steel bands 15 and 16, when the heating and retaining band is tightened about the mold sections, and how when the heating and retaining band is loosed, the several parts will assume the relationship illustrated in Figure 4 of the drawings. A thermostat 18 is connected with the heating band 14 and with a source of electrical energy by means of the wires 19. The thin steel band 17 is provided at its ends with the outwardly extending arms or brackets 20 which support the threaded trunnions 23, which in turn support the turn buckle screw 21, which when rotated in one direction draws the clamping and heating band tightly around the mold sections, and when turned in the opposite direction, loosens the band, so that the same may be swung upwardly from the mold and out of the way, so that the mold sections may be swung outwardly and a casing placed in or removed from the mold. The clamping and heating band 17 carries an arm 24, which is pivoted at 25 to a supporting bolt 26 extending through the table 1.

Figure 2:
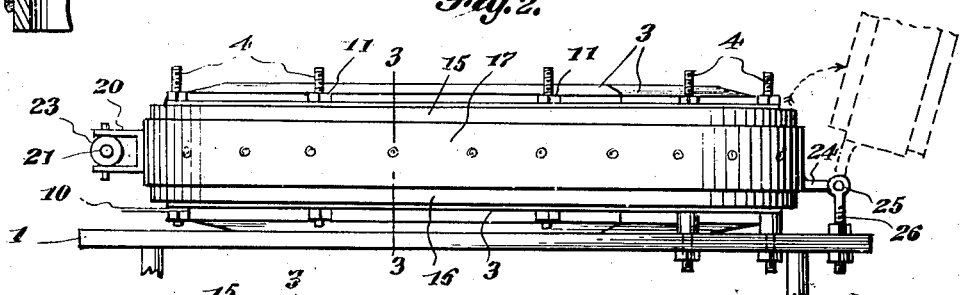
Figure 2 is a side elevation of my improved tire recap mold showing in dotted lines the manner of raising the adjustable heating and clamping band.

In operation, the turn buckle screw 21 is rotated to loosen up the clamping and heating band from the mold sections, and is swung upwardly and away from the mold sections as shown in dotted lines in Figure 2 of the drawings. The two outer mold sections which are hinged to the center fixed section, may then be swung outwardly and away from the fixed section so that the tire casing in the mold may be quickly and easily peeled from the mold. Conversely, when a casing is to be recapped, it is placed within the mold sections, which are then closed and the retaining and heating band is swung downwardly over the mold sections, and the turn buckle screw 21 rotated to firmly hold the sections in place. Of course, a curing bag 27 and curing rim 28 will be placed within the casing to be recapped before the mold is tightened up on the casing. The contruction of the hinges between the mold sections permits of an outwardly and inwardly movement as well as a lenghtening movement between the cooperating mold sections, which adapts the mold to oversize casings, and to ready loading and unloading of the same.

Many minor changes in detail of construction may be resorted to without departure from the spirit of the invention.

Having thus described my invention what I claim as new and desire to secure by Letters Patent of the United States is:

1. A tire casing recap mold comprising a plurality of circumferentially split arcuate mold sections, sliding hinge means connecting said mold sections, and an adjustable clamping and heating band positioned about said mold sections to hold them in adjusted position while the tire casing is being recapped.

2. A tire casing recap mold comprising a plurality of arcuate mold sections each split circumferentially to form upper and lower segments, hinge means connecting the lower mold segments, adjustable fastening means for holding the segments of each section together, and an adjustable clamping and heating band positioned about said mold sections to hold them in position while recapping a tire casing.

3. A tire casing recap mold comprising a plurality of arcuate mold sections each split circumferentially into segments, slidable hinge means connecting said mold sections, adjustable fastening means for holding the segments of each section together, spacer elements positioned between the segments of each section, and a flexible composite clamping and heating band positioned about said mold sections to hold them in position while recapping a tire casing.

4. A tire casing recap mold comprising a plurality of arcuate mold sections each split circumferentially into segments adapted to be positioned about a tire casing to form a complete circle, slidable hinge means connecting said mold sections, adjustable fastening means for holding the segments of each section together, spacer elements positioned between the segments of each section and an adjustable and flexible clamping heating band to hold the molding sections in an adjusted position while the said tire casing is being recapped, said band being pivotally mounted whereby it may be swung away from said mold sections after the recapping process has been completed.

5. A tire casing recap mold comprising three arcuate mold sections each split circumferentially into segments, one of said mold sections being fastened in fixed position, and the remaining mold sections being movable, sliding hinge means connecting the movable sections with the fixed mold section, and a composite adjustable clamping and heating band positioned about said mold sections while a tire casing is being recapped.

DONALD M. MacMILLAN.